Nov. 29, 1932.  D. F. ERRETT  1,889,723
VEHICLE WHEEL
Filed Nov. 2, 1931  2 Sheets-Sheet 1

Inventor
D. F. Errett

By Clarence A. O'Brien
Attorney

Patented Nov. 29, 1932

1,889,723

UNITED STATES PATENT OFFICE

DAVID FRANKLIN ERRETT, OF WESTON, OHIO

VEHICLE WHEEL

Application filed November 2, 1931. Serial No. 572,654.

The present invention relates generally to vehicle wheels, and more particularly to a device of this character which is especially intended for use on tractors and has for its primary object to provide, in a manner as hereinafter set forth, a wheel of this character which is equipped with a plurality of traction lugs, said lugs being mounted in a novel manner to permit the same to be retracted when desired, as when the tractor is travelling over hard surfaces, such as concrete.

Other objects of the invention are to provide a vehicle wheel of the character described which will be simple in construction, strong, durable, efficient and reliable in use, and which may be manufactured at low cost.

All of the foregoing and still further objects and advantages of the invention will become apparent from a study of the following specification, taken in connection with the accompanying drawings, wherein like characters of reference designate corresponding parts throughout the several views, and wherein:—

Figure 1:
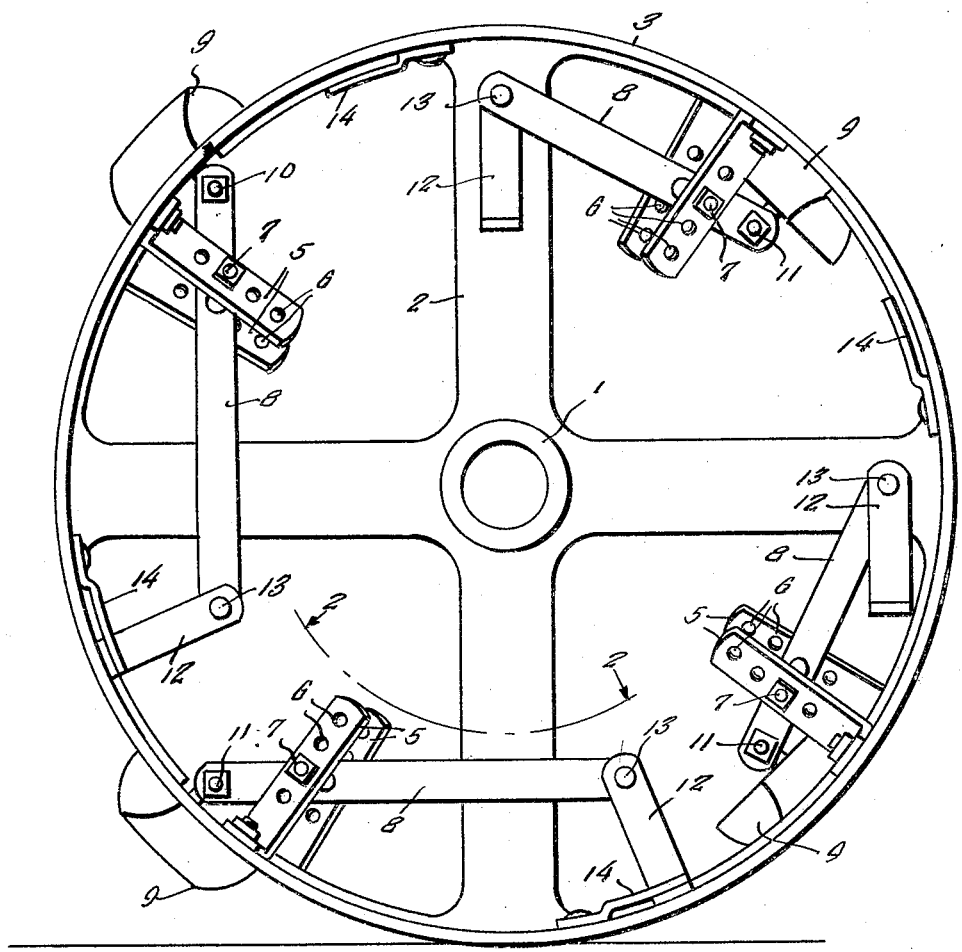
Figure 1 is a view in side elevation of a wheel in accordance with the present invention, some of the lugs being shown in projected or operative position and some of said lugs being retracted or in inoperative position.
Figure 5:
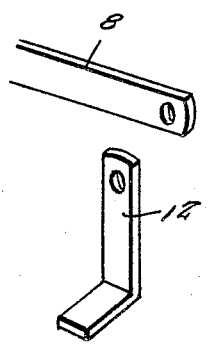
Fig. 5 is a detail view in perspective showing one of the keepers and an end portion of the lever to which said keeper is pivotally connected.

Referring now to the drawings in detail, it will be seen that the wheel constituting the present invention comprises a hub portion 1 from which the spokes 2 radiate. The reference numeral 3 designates the rim of the wheel. In the embodiment of the invention illustrated, the hub, spokes, and rim are integral with each other.

The rim 3 has formed therein the circumferentially spaced, diagonally disposed openings 4. Mounted rigidly on the inner periphery of the rim 3 and projecting inwardly are the diagonally disposed pairs of brackets 5 having series of openings 6 therein. Pivot pins 7 extending between these pairs of brackets 5, are selectively insertable in the openings 6 and mounted for swinging movement on said pivot pins are the levers 8.

The pivot pins 7, extend through intermediate portions of the levers 8. The reference numeral 9 designates lugs of substantially triangular cross section which are operable through the openings 4 in a manner to project beyond the outer periphery of the rim 3 of the wheel, as illustrated to advantage in Fig. 1 of the drawings. Projecting inwardly from the lugs 9 are the eyes 10 for receiving the bolts 11 for pivotally mounting the lugs on the levers 8.

Figure 2:
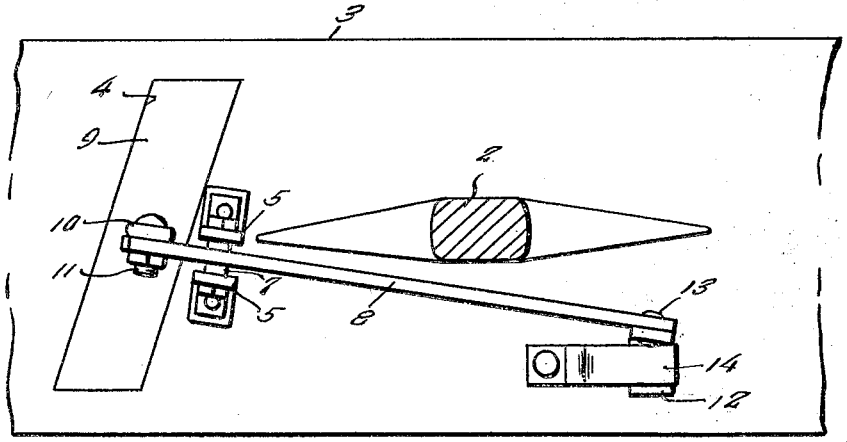
Fig. 2 is a sectional view taken substantially on the line 2—2 of Fig. 1.
Figure 3:
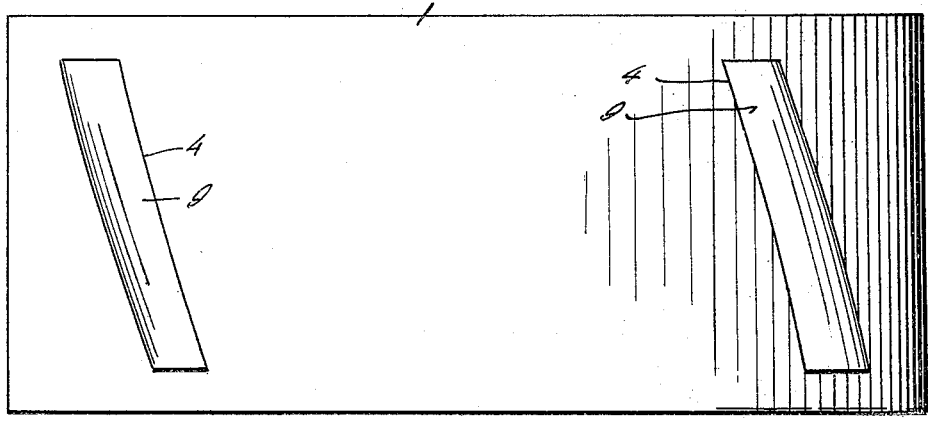
Fig. 3 is a plan view of the wheel.
Figure 4:
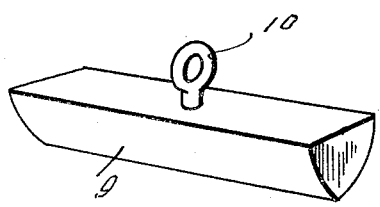
Fig. 4 is a detail view in perspective of one of the lugs.

As best seen in Fig. 2 of the drawings, the levers 8 extend diagonally relative to the rim 3 and adjacent one side of the spokes 2 of the wheel.

Angular keepers 12 are pivotally connected, as at 13, for swinging movement on the other end portions of the levers 8, and are engageable beneath the hooks 14 which are mounted on the inner periphery of the rim 3 for securing the levers against swinging movement, thereby maintaining the lugs 9 in substantially fixed position in the openings 4 of the rim 3.

When it is desired to permit retraction of the lugs 9, as when the tractor or other vehicle is passing over hard surfaced highways, the keepers 12 are disengaged from the hooks 14, as seen in Fig. 1 of the drawings, and then when pressure is exerted on the lugs, they move inwardly through the openings 4, as will be apparent. If desired, suitable means may be engaged with the levers 8 for maintaining said levers against idle swinging movement when the keepers are disengaged from the hooks 14, and the lugs are not in use.

Through the medium of the series of openings in the brackets 5 the lugs 9 may be adjusted when in use as desired. Obviously, as the pins are moved toward the inner ends of the brackets 5, the distance which the lugs project outwardly from the rim 3 when in operative position will be reduced.

It is believed that the many advantages of a wheel in accordance with the present invention will be readily understood, and although the preferred embodiment of the invention is as illustrated and described, it is to be understood that changes in the details of construction, and in the combination and arrangement of parts, may be resorted to which will fall within the scope of the invention as claimed.

Having thus described my invention, what I claim as new is:—

1. A wheel including a rim having circumferentially spaced openings therein, pairs of brackets mounted on the inner periphery of the rim adjacent the openings, and having series of openings therein, pivot pins extending between the pairs of brackets and selectively insertable in the openings, levers mounted for swinging movement on the pivot pins, said pivot pins extending through intermediate portions of the levers, lugs pivotally connected to one end portion of the levers and operable through the rim openings, means for releasably securing the levers against swinging movement, said means including hooks mounted on the inner periphery of the rim, and angular keepers pivotally mounted for swinging movement on the other end portions of the levers, and engageable beneath the hooks.

2. A wheel including a rim having circumferentially spaced, diagonally extending openings therein, pairs of diagonally disposed brackets rigidly mounted on the inner periphery of the rim adjacent the openings and extending inwardly from said rim, said brackets having series of openings therein, pivot pins extending between the pairs of brackets and selectively insertable in the bracket openings, levers mounted for swinging movement on the pivot pins, said pivot pins extending through intermediate portions of the levers, lugs of substantially triangular cross section, pivotally connected to one end portion of the levers and operable through the openings in the rims, said lugs conforming substantially in shape to the openings and extending diagonally relative to the rims, hooks mounted on the inner periphery of the ring, and angular keepers pivotally mounted for swinging movement on the other end portions of the levers, and engageable beneath the hooks for releasably securing the levers against swinging movement.

3. In a wheel including a rim having an opening therein, a bracket connected to the inner face of the rim, a lever pivoted intermediate its ends to said bracket, a lug pivotally connected to one end of the lever and projecting through the opening when the lever is moved to a certain position, a hook shaped member pivoted to the other end of the lever and a hook secured to the inner face of the rim for engagement by the hook shaped member for holding the lever in position with said lug projecting through the opening.

In testimony whereof I affix my signature.

DAVID FRANKLIN ERRETT.